US005920424A

United States Patent [19]
Espindola et al.

[11] Patent Number: 5,920,424
[45] Date of Patent: Jul. 6, 1999

[54] ARTICLE COMPRISING A BROADBAND OPTICAL FIBER AMPLIFIER

[75] Inventors: Rolando Patricio Espindola, New Providence; Paul Francis Wysocki, Flemington, both of N.J.

[73] Assignee: Lucent Technologies Inc., Murray Hill, N.J.

[21] Appl. No.: 09/048,729

[22] Filed: Mar. 26, 1998

Related U.S. Application Data

[63] Continuation-in-part of application No. 08/801,608, Feb. 18, 1997, abandoned.

[51] Int. Cl.⁶ .................................. G02B 6/26; H01S 3/06
[52] U.S. Cl. ........................... 359/341; 359/161; 359/337
[58] Field of Search .................................. 359/134, 160, 359/161, 174, 337, 341

[56] References Cited

U.S. PATENT DOCUMENTS

| | | | |
|---|---|---|---|
| 5,131,069 | 7/1992 | Hall et al. | 385/142 |
| 5,216,728 | 6/1993 | Charlton et al. | 385/27 |
| 5,260,823 | 11/1993 | Payne et al. | 359/341 |
| 5,583,689 | 12/1996 | Cassidy et al. | 359/341 |
| 5,731,892 | 3/1998 | DiGiovanni et al. | 359/341 |

OTHER PUBLICATIONS

Wysocki et al; IEEE Photonics Tech. Letters, vol. 91, #10, pp. 1343–1345 abstract only herewith, Oct. 1997.
Wysocki et al, Conf. Optical Fiber Communications, vol. 6, pp. 375–381 : Abst. Only Herewith, Feb. 21, 1997.
Wysocki et al, Conf. Optical Fiber Commun; vol. 6, pp. 127–129. Abst. Only Herewith, Feb. 21, 1997.
Giles et al, IEEE Photonic Tech. Letters, vol. 12, pp. 866–868, 1990.
"Split–beam Fourier Filter and its Application in a Gain–flattened EDFA", by R. A Betts, *OFC '95 Technical Digest*, Paper TuP1, pp. 80–81.
"Gain–flattened Optical–fiber Amplifiers with a Hybrid Er–doped–fiber Configuration for WDM Transmission", by T. Kashiwada et al., OFC '95 Technical Digest, Paper TuP1, pp. 77–78.
"Ultra Wide Band Erbium–Doped Silica Fiber Amplifier with 80 nm of Bandwidth", by Y. Sun et al., 1997 Technical Digest, *Optical Society of America*, pp. 144–147.
"Wavelength Division Multiplexing in Long–Haul Transmission Systems", by N. S. Bergano, *Optical Amplifiers and Their Applications*, 1966 Technical Digest (Optical Society of America, Washington, D.C., 1966), pp. 6–9.
"Modeling Erbium–Doped Fiber Amplifiers", by C. R. Giles, *Journal of Lightwave Technology*, vol. 9, No. 2, Feb. 1991, pp. 271–283.

*Primary Examiner*—Nelson Moskowitz
*Attorney, Agent, or Firm*—Eugen Pacher

[57] ABSTRACT

We have found that it is possible to make a multistage optical fiber amplifier having a substantially flat gain band of spectral width of 40 nm or more, excellent noise figure (e.g.,<4 dB) and output power. Such amplifiers can advantageously be used, for instance, in multichannel WDM systems and analog CATV systems. A significant aspect of the amplifier is the provision of an optical loss element (exemplarily a multi-grating optical fiber filter) that provides, at least at one wavelength in the gain band, an attenuation of more than $\bar{G}/3$ dB, where $\bar{G}$ is the average amplifier gain (in dB) in the gain band. A further significant aspect of the amplifier is the use of relatively longer amplifier fibers, which facilitates attainment of high output power and low noise figure. Exemplarily, the amplifier is a 2-stage amplifier comprising silica-based Er-doped amplifier fiber, with three-Gaussian filters between the stages. By way of further example, the amplifier has 3 or more stages, with the loss elements selected such that the loss, in absolute value, is greater than $\bar{G}$, and the gain bandwidth of the amplifier is 80 nm or more.

11 Claims, 4 Drawing Sheets

ARTICLE COMPRISING A BROADBAND OPTICAL FIBER AMPLIFIER

CROSS-REFERENCE TO RELATED APPLICATION

This is a continuation-in-part application under 37 CFR 1.53(b) of application Ser. No. 08/801,608, filed Feb. 18, 1997, now abandoned.

FIELD OF THE INVENTION

This invention pertains to articles and systems (collectively "articles") that comprise a multistage rare earth-doped optical fiber amplifier.

BACKGROUND

As rare earth-doped fiber amplifiers are being used in new applications such as multiple-wavelength WDM systems and analog CATV systems, spectral gain flatness is becoming increasingly important. While silica-based erbium-doped fiber amplifiers (EDFAs) can produce high output power and low noise figure (NF) when pumped near 980 nm, the usable gain bandwidth for optical communications is limited to about 12 nm because the gain is spectrum is not flat and varies with operating conditions (signal power, etc.). Improved gain flatness has been achieved using an erbium-doped fluoride-based fiber amplifier (EDFFA). However, such amplifiers are more difficult to produce, handle and splice, have not yet achieved high output powers and can only be pumped near 1480 nm, which limits the lowest achievable noise figure to about 4 dB.

Gain flatness has also been improved by means of optical filtering (see R. A Betts et al., *Technical Digest OFC '95*, Paper TuP4) or by combining fibers of different host composition (see T. Kashiwada et al., *Technical Digest OFC '95*, Paper TuP1). US patents 5,131,069, 5,216,728, 5,260,823 and 5,583,689 also pertain to filtered fiber amplifiers. U.S. Pat. No. 5,731,892 pertains to multistage fiber amplifiers.

Prior art fiber amplifiers typically can provide substantially flat gain over a spectral region of width up to about 30 nm. See, for instance. U.S. Pat. No. 5,260,823. This limits, for instance, the number of communication channels that can be transmitted through a single mode optical fiber communication system. It clearly would be desirable to have available an optical fiber amplifier that can provide substantially flat gain over a wider spectral region, exemplarily 40 nm or even more. Furthermore, it would be desirable if the amplifier utilized silica-based optical fiber, thereby avoiding compatibility problems with silica-based transmission fiber and other silica-based fiber components. Still furthermore, it would be desirable that the increased bandwidth be attainable without significant degradation of the amplifier noise figure (NF) and without substantial reduction in output power. This application discloses such an amplifier, and optical fiber communication systems that comprise the amplifier.

Using splitting of the optical channels into two bands and gain equalization filters, Yan Sun et al. recently were able to achieve relatively flat gain over 80 nm bandwidth. See Yan Sun et al., "Optical Amplifiers and Their Applications," 1997 Technical Digest, pp. 144–147, Optical Society of America. However, the approach is complex and thus expensive, requiring inter alia circulators, isolators and a considerable quantity (e.g., 200–500 m) of Er-doped silica fiber. Clearly, it would be desirable to have available a less complex technique for achieving flat gain over a large bandwidth, e.g., 40 nm or more, even 80 nm.

GLOSSARY AND DEFINITIONS

By a "substantially flat" gain over a wavelength region we mean herein a gain spectrum meeting the criterion $(G_{max}-G_{min})/\overline{G} \leq 0.1$, preferably <0.05 or even 0.03, over the wavelength region, where $G_{max}$ and $G_{min}$ are respectively the maximum and minimum gain in the wavelength region (both in dB), and $\overline{G}$ is the average gain over the wavelength region (in dB). The average gain $\overline{G}$ herein typically is referred to as the gain of the amplifier in the gain band.

By a "multistage" optical amplifier we mean herein an optical amplifier having two or more (serially connected) Er-doped optical amplifier fibers, with an optical loss element between two amplifier fibers. The amplifier fibers of a multistage amplifier can, but need not be, of the same design and/or composition. The "spectral width" of a gain band herein is the spectral region over which the gain is substantially flat, as defined above.

The "noise figure" (NF) of an optical fiber amplifier is defined as the ratio of the signal to noise ratio after the amplifier to the signal to noise ratio before the amplifier.

An "optical loss element" herein is an optical element, comprising one or more lossy components and disposed in an optical fiber path, that introduces loss at a predetermined wavelength or wavelengths into the optical fiber path. The loss can be due to any appropriate mechanism, including, but not limited to, absorptive loss, scattering loss, mode conversion loss due to the conversion of guided mode radiation to non-guided mode radiation (typically by means of a long-period grating), and wavelength selective reflection due to the presence of a controlled periodic index variation deliberately induced in the fiber (a "grating"), or due to the presence of a thin film multilayer filter.

The above definition is intended to exclude Er-doped fiber as a possible loss element, since herein Er-doped fiber is amplifier fiber. See U.S. Pat. No. 5,131,069 for disclosure of absorbing ion filtering means, including unpumped gain ion filtering means.

The loss of a loss element that comprises two or more lossy components (e.g., gratings or thin film filters) is the combined loss of two or more lossy components.

SUMMARY OF THE INVENTION

We have discovered that it is possible, through judicious choice of components and operating parameters, to obtain a multistage (two or more stages) fiber amplifier that has substantially flat gain over a significantly wider wavelength region than was previously thought practical, without significant increase of the noise figure and without significant decrease of the output power. This unexpected finding makes it possible to increase the number of communication channels of an optical fiber WDM system above what was previously thought possible, and thus is of considerable commercial significance.

Preferred embodiments of the invention utilize amplifier fibers that are significantly longer than typically found in the prior art. Appropriate choice of the length of the input amplifier fiber provides the desired low noise figure, and appropriate choice the length of the output amplifier fiber provides the desired high output power despite the significant loss deliberately introduced by an optical loss element of predetermined loss spectrum that is provided between the amplifier fibers.

In a broad aspect the invention is embodied in an improved broadband multistage optical fiber amplifier, and in a communication system that comprises such an amplifier. Typically the amplifier has substantially constant gain over a spectral region of 40 nm or more.

More specifically, the amplifier according to the invention comprises two or more stages, with an optical loss element between the two stages (or any two stages). Each stage comprises an Er-doped silica-based (more than 50 mole % $SiO_2$) amplifier fiber. The amplifier further comprises one or more sources of pump radiation, and means for providing the pump radiation to the amplifier fibers.

Significantly, the optical loss element (or elements) are selected to provide, at least at one wavelength within the gain band of the optical amplifier, an attenuation of more than $\overline{G}/3$ dB in absolute value, such that the predetermined wavelength region has spectral width of 40 nm or more, as much as 45 nm, even 60 or 80 nm.

The above cited paper by Yan Sun et al. states, we believe, the generally held opinion regarding attainable flat gain bandwidth in Er-doped silica fiber amplifiers. The relevant passage reads as follows:

"Although the total gain spectrum of erbium-doped silica fiber amplifiers is very wide, the usable gain bandwidth is limited to about 12 nm by the large variations of the gain spectrum. With gain equalization filters (GEFs), this gain bandwidth can be extended to between 35 and 40 nm, from around 1525 to about 1565 nm. Since the gain drops sharply below 1525 nm or above 1565 nm, it is not practical to further increase the gain bandwidth with GEFs."

See also N. S. Bergano, *Optical Amplifiers and Their Applications,* 1996 Technical Digest (Optical Society of America, Washington, D.C., 1996) pp. 6–9, wherein the following appears on pp. 6–7.

"Gain Equalization—The usable bandwidth of a single EDFA is generally accepted to span a wavelength range of about 35 nm (1530 nm to 1565 nm). However, only about 10% of the EDFA's intrinsic bandwidth is available for the transmission of data over a long chain of 1480 nm pumped amplifiers operated in gain compression. The usable bandwidth of a long amplifier chain can be increased three fold by using passive gain equalizing filters. FIG. 1 shows the gain profile of the amplifier chain with and without the gain equalizers. At 6300 km the 10 dB spectral width of the system was over 11 nm with the filters, compared to 3.5 nm without the filters".

We will demonstrate below that, despite the general belief to the contrary, it is not only feasible but advantageous to provide flat gain bandwidths of 40 nm or more, with good NF, by appropriate spectral filtering.

Multistage amplifiers according to the invention can have two or more stages, with an optical loss element between some or all of the stages. The amplifier fibers typically are Er-doped silica-based amplifier fibers.

An exemplary amplifier according to the invention is a two-stage amplifier, with both the upstream (input) stage and the downstream (output) stage comprising silica-based Er- and Al-doped fiber, and with the optical loss element being an optical filter. The filter could comprise a long-period or short period grating filter, interference filter, thin film filter, or any other suitable optical filter.

Typically, the spectral width of the gain band is more than 40 nm, and the gain variation over the gain band is such that the variation is less than 10%, typically less than 5%, preferably as low as 3%. The lengths of the first and second amplifier fibers are selected such that degradation of the noise figure and of the output power of the amplifier is substantially avoided, as compared to the noise figure and output power of an otherwise identical comparison amplifier that does not have the optical loss element. Typically this requires that the amplifier fibers of the amplifier according to the invention are relatively long.

Optical filters for prior art amplifiers having a gain band of 30 nm or less spectral width can easily be made such that no wavelength in the gain band experiences loss exceeding 20% of the desired gain. For example, for a 28 dB amplifier, an optical filter that introduces less than 5.6 dB loss could readily be designed. However, for a gain band of 35 nm or more spectral width, all possible filters are required to produce loss exceeding 25% (in dB) of the desired gain for at least one wavelength in the relevant wavelength region. This loss grows to 33% for a 40 nm spectral width, and to 45% for a 45 nm bandwidth, with loss typically at all wavelengths within the gain band.

In view of the necessarily high loss introduced by the optical filter element, it is surprising that conditions exist that result in a substantially flat gain band of spectral width of 40 nm or more, with low NF and high output power. It is even more surprising that we have been able to extend, by the appropriate use of loss elements, the flat gain bandwidth of a multistage EDFA to 45 nm, even 60 or 80 nm. The latter was accomplished in a 3-stage amplifier, with the total loss of the loss elements being larger than the external amplifier optical gain $\overline{G}$. In principle it is possible to achieve even greater bandwidths through the use of more stages and loss elements (typically filters).

DETAILED DESCRIPTION OF PREFERRED EMBODIMENTS

Figure 1:
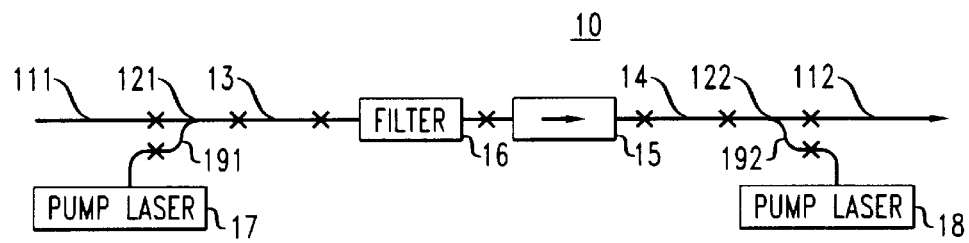
FIG. 1 schematically depicts an exemplary amplifier according to the invention.

FIG. 1 schematically shows an exemplary dual-stage amplifier 10 according to the invention. Signal radiation is provided to the amplifier through conventional transmission fiber 111, and amplified signal radiation is provided by the amplifier to conventional transmission fiber 112. The input radiation propagates through conventional fiber coupler 121 to Er-doped silica-based input amplifier fiber 13. Pump laser 17 provides pump radiation (e.g., 100 mW at 1480 or 980 nm) in conventional manner to pump input 191 of fiber coupler 121 and hence to amplifier fiber 13. The amplified signal then passes through optical filter 16 and optional optical isolator 15 to downstream Er-doped silica-based amplifier fiber 14. Pump laser 18 provides pump radiation (e.g., 100 mW at 1480 nm) in conventional manner to pump input port 192 of fiber coupler 122 and hence to amplifier fiber 14. Further amplified signal radiation is provided to transmission fiber 112 through fiber coupler 122. In FIG. 1, the "x" symbols refer to fiber splices, as is conventional.

Figure 2:
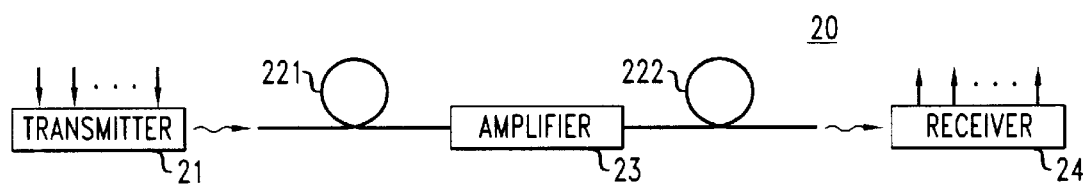
FIG. 2 schematically shows an exemplary optical fiber communication system according to the invention.

FIG. 2 schematically depicts an exemplary multichannel wavelength division multiplexed communication system 20 according to the invention, but an amplifier according to the invention could also advantageously be used in an analog CATV system. The fibers typically have a Ge-doped core. They may also contain other dopants in conventional manner, e.g., $Al_2O_3$.

Transmitter 21 receives a multiplicity of inputs, and has a multi-wavelength optical output that is coupled into transmission fiber 221 and guided downstream to amplifier 23. The amplifier is substantially as shown in FIG. 1. Amplified signal radiation is coupled into transmission fiber 222 and propagates therethrough to receiver 24. The receiver has a multiplicity of outputs. Typically, communication systems according to the invention have a multiplicity of optical amplifiers, at least one of which is a multistage amplifier according to the invention.

Figure 3:
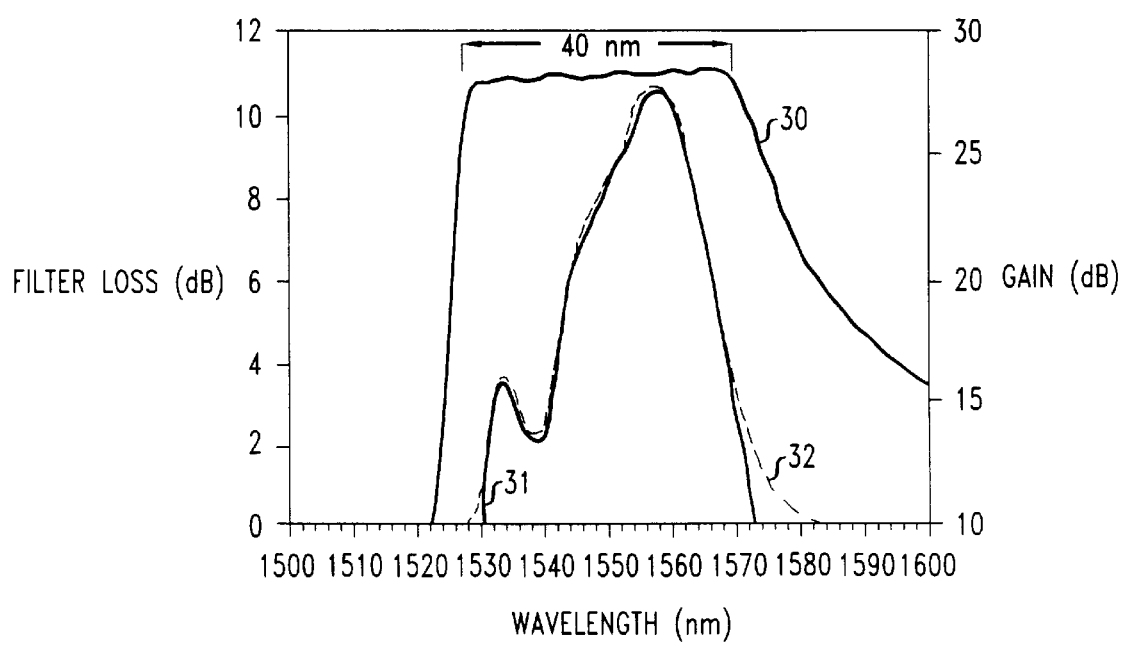
FIGS. 3 and 4 show exemplary data on amplifier gain and filter loss.

FIG. 3 shows the gain spectrum 30 of an exemplary 2-stage amplifier according to the invention. As can be seen, the amplifier has 28 dB gain, with a substantially flat gain band of 40 nm width. The gain variation is 3.2% over the 40 nm gain band. FIG. 3 also shows the ideal filter loss spectrum 31 that produces optimal results, as well as the loss spectrum 32 that can be attained with three Gaussian filters, i.e., with a loss element consisting of three lossy components (three Gaussian filters). As can be seen, the three Gaussian filters closely reproduce the ideal curve, except at the edges of the spectral region.

The results of FIG. 3 pertain to a two-stage amplifier that uses a total of 27 m of silica-based amplifier fiber. The fiber core contained 6 mole % $Al_2O_3$, 12 mole % $GeO_2$ and enough $Er_2O_3$ to produce 6 dB/m attenuation at 1530 nm. The input and output stages comprise respectively 16 and 11 m of the fiber. The input stage is co-pumped with 100 mW of 980 nm radiation, and the output stage is counter-pumped with 100 mW of 1480 nm radiation.

The gain spectrum of FIG. 3 was obtained by numerical simulation of the amplifiers. Such simulations are well known to those skilled in the art. See, for instance, C. R. Giles et al., *J. Lizhtwave Technology*, Vol. 9(2), p. 271 (1991), incorporated herein by reference. As can be seen from FIG. 3, the filter loss at about 1558 nm is about 10 dB, substantially more than 33% of the amplifier gain (27 dB).

Figure 4:
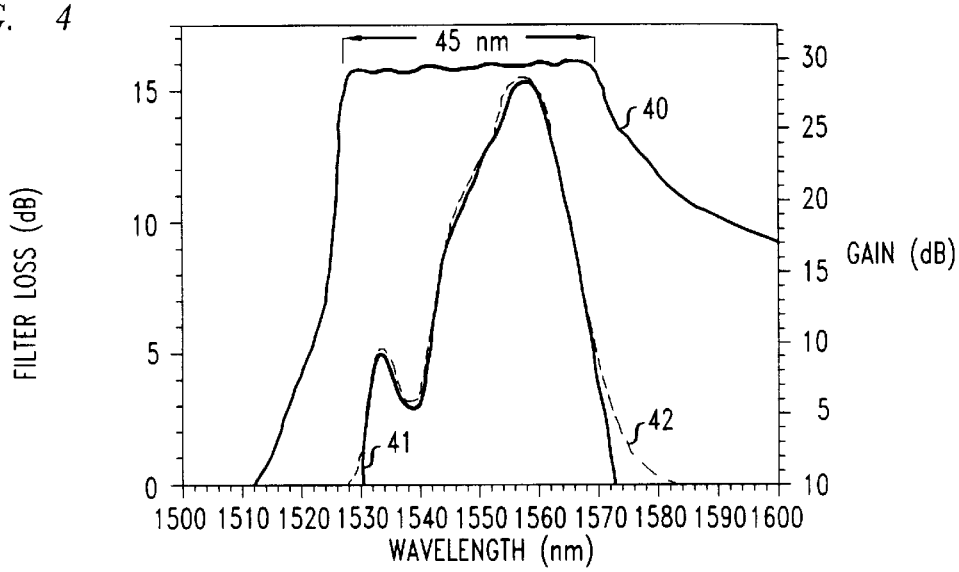

FIG. 4 shows data similar to that of FIG. 3, with numerals 40–42 referring, respectively, to the gain spectrum, filter loss of an ideal filter, and filter loss of three appropriately selected Gaussian filters. The amplifier fiber is as described above, except that a total of 30 m of amplifier fiber is used. The amplifier has 28 dB gain, with substantially flat gain band of 45 nm, and with a gain variation of 6.4% over the 45 nm gain band.

By way of example, the three Gaussian filters of FIG. 3 have center wavelengths of 1532.5 nm, 1545.4 nm and 1558.4 nm, respectively, widths of 6.8 nm, 14.7 nm and 18.6 nm, respectively, and center loss of 3.25 dB, 5.3 dB and 10 dB, respectively. Gaussian filters are well known to those skilled in the art, who also know how to synthesize a desired filter response by concatenation of two or more such filters.

As can be seen from FIG. 4, the filter loss at about 1558 nm is about 14 dB, more than 45% of the amplifier gain of 28 dB.

Figure 5:
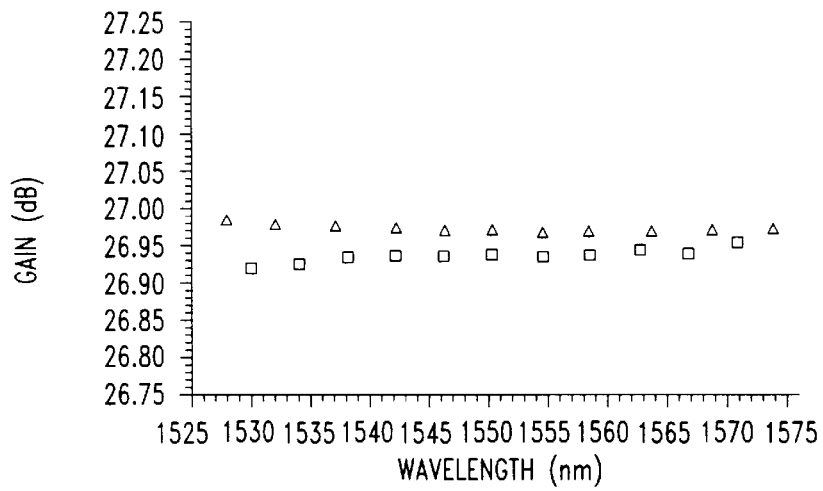
FIGS. 5 and 6 show data on gain and noise figure vs. wavelength, respectively.

FIG. 5 shows the gain as a function of wavelength for 11 equal channels, spaced uniformly across the substantially flat gain band, with total signal −7.6 dBm. The amplifier is pumped as described above: The total length of amplifier fiber is optimized for gain flatness. The fiber was as described above. The triangles and squares are cases according to FIGS. 3 and 4, respectively, run through simulation with 11 channels. This verifies design and provides noise figures. In FIG. 5, the triangles and squares refer, respectively, to amplifiers having 15/15 m and 16/11 amplifier fiber length, where the first number of the pair refers to the input stage, and the second refers to she output stage. As can be seen from FIG. 5, the gain is substantially flat in both cases over a spectral region of 40 nm or more. In the simulations for FIG. 5, ideal filters were used. Use of 3-Gaussian filters would not have significantly changed the results.

Figure 6:
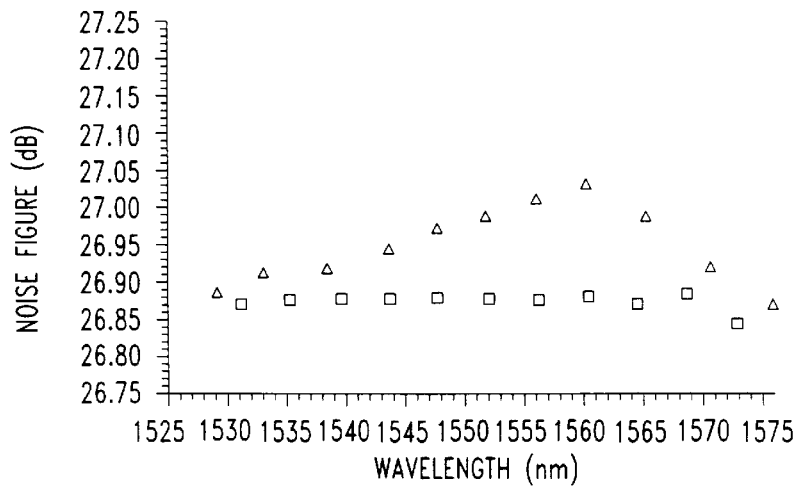

FIG. 6 shows noise figure as a function of wavelength, for the above recited conditions. As can be seen from FIG. 6, both amplifiers have <4 dB NF over the substantially flat gain band, with the amplifier that has relatively longer amplifier fiber in the input stage having substantially flat low NF over the gain band.

We have found that in general it is desirable to use relatively long lengths of amplifier fiber, typically more than about 30% longer than in a corresponding optimized design that does not have a loss element between the stages. Use of substantially more amplifier fiber makes possible allotment of more fiber to the input stage for good NF, while leaving enough fiber for the output stage for power conversion. It will be understood that most of the output power comes from the output stage. Thus it is possible to lengthen the output stage and recover most of the power lost between the stages, without significant degradation of the NF.

Optimal total amplifier fiber length as well as optimal division between stages depends on a variety of factors, including desired ion inversion, pump wavelength and intensity, and interstage loss. Thus it is not possible to provide general rules. However, a modest amount of experimentation, preferably numerical simulation, will generally suffice to determine amplifier fiber lengths that yield acceptable performance in any given case.

Figure 7:
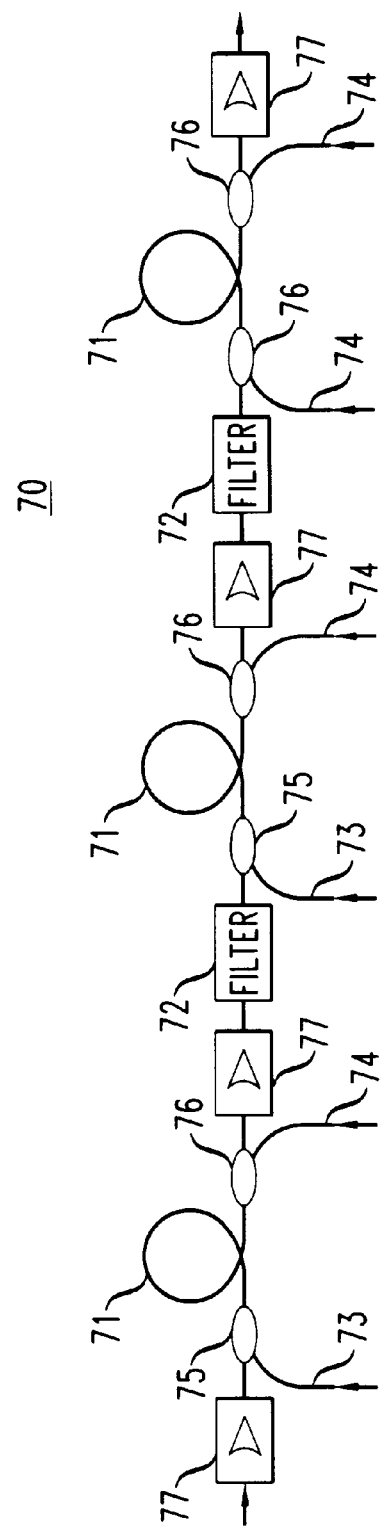
FIG. 7 shows an exemplary 3-stage amplifier with about 80 nm flat gain bandwidth.

FIG. 7 schematically depicts an exemplary multistage fiber amplifier according to the invention, namely, a 3-stage amplifier 70. Numerals 71 and 72 respectively refer to lengths of Er-doped amplifier fibers and to gain-equalizing filter elements. Numerals 73 and 74 respectively refer to 980 nm and 1480 nm pump radiation from known sources (not shown) that is being coupled into the amplifier by conventional fiber couplers 75 and 76, respectively. Numerals 77 refer to conventional optical isolators.

Figure 8:
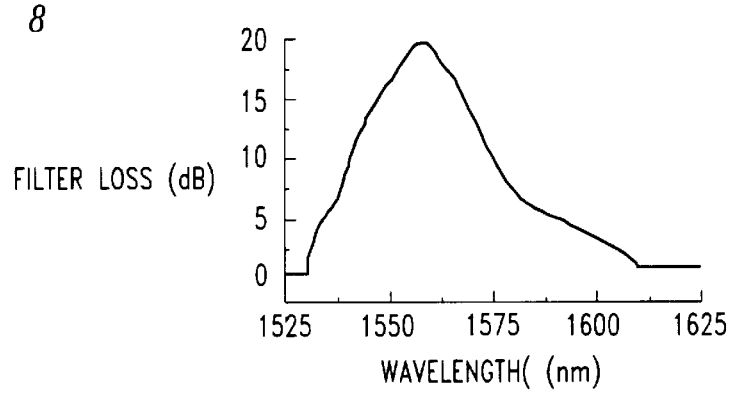
FIG. 8 shows the loss spectrum of an exemplary gain-equalizing filter.
Figure 9:
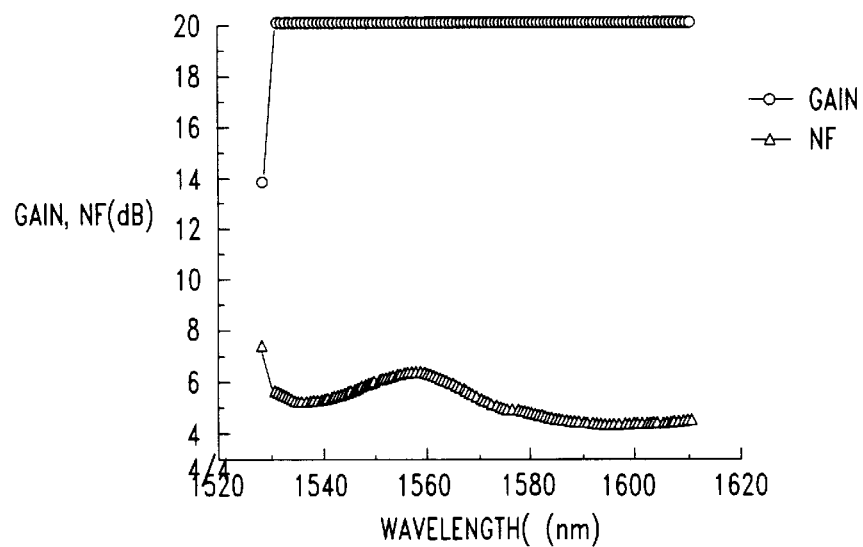
FIGS. 9 and 10 show the gain and noise spectrum of two 3-stage amplifiers according to the invention.

By way of example, a 3-stage amplifier according to the invention comprises a total of 58.4 m of Er-doped amplifier fiber (25.4 m, 16.5 m and 16.5 m, respectively), with identical gain-equalizing filters (exemplarily long period grating filters) between the input stage and intermediate stage, and intermediate stage and output stage. The fiber core contained 6 mole % $Al_2O_3$, 12 mole % $GeO_2$, and enough $Er_2O_3$ to provide 6 dB/m attenuation at 1530 nm. The filter characteristics are shown in FIG. 8. Power in each of 80 channels (spaced 1 nm apart, from 1530–1610 nm) is −21 dBm, with total power being 0.64 mW. The flat gain is 20 dB, giving output power of −1dBm for each channel, with total output power being 64 mW. Co-propagating pump power is 120 mW at 980 nm for each stage. FIG. 9 shows the computed gain and NF for the described 3-stage amplifier.

Figure 10:
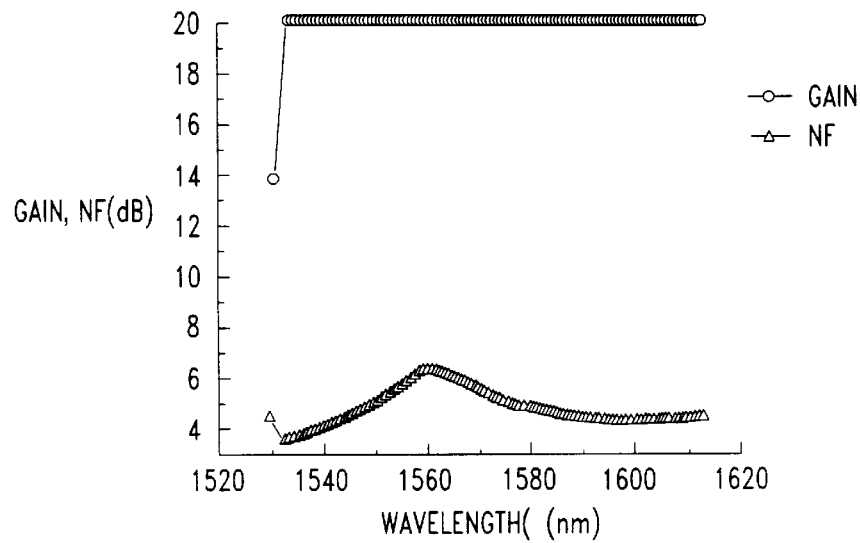

FIG. 10 shows computed gain and NF for a further exemplary 3-stage amplifier, which differs from the above-described one only with respect to the distribution of the Er-doped amplifier fiber among the amplifier stages (18.4 m, 20 m, 20 m, respectively).

Although both amplifiers can provide 20 dB gain over an 80 nm bandwidth, the data of FIGS. 9 and 10 show that the first-described amplifier provides somewhat better NF than the other amplifier, because the longer input stage of the former provides more gain where the filter loss is greatest (~1560 nm).

The invention claimed is:

1. An article comprising a multistage optical fiber amplifier comprising at least two amplifier stages, with an optical loss element between the at least two stages, each amplifier stage comprising a length of silica-based Er-doped amplifier fiber, the multistage optical amplifier furthermore comprising at least one radiation source for providing pump radiation to said at least two amplifier fibers; the multistage optical amplifier having a gain band of substantially flat gain over a predetermined wavelength region;

CHARACTERIZED IN THAT the at least one optical loss element is selected to provide, at least at one wavelength within the gain band of the optical amplifier, an attenuation of more than $0.45 \overline{G}$ dB in absolute value, where $\overline{G}$ is the average gain over the gain band, such that the multistage optical fiber amplifier has substantially flat gain over a spectral width of more than 45 nm.

2. Article according to claim 1, wherein the multistage optical amplifier is a 2-stage optical amplifier, with the optical loss element selected to provide the 2-stage amplifier with a substantially flat gain over a spectral more than 45 nm.

3. Article according to claim 2, wherein the multistage optical amplifier is a 3-stage optical amplifier, with an optical loss element between each two adjacent amplifier fibers.

4. Article according to claim 1, wherein the at least one optical loss element comprises a single lossy component.

5. Article according to claim 1, wherein the at least one optical loss element comprises a multiplicity of lossy components.

6. Article according to claim 1, wherein the optical loss element comprises a refractive index grating.

7. Article according to claim 1, wherein the optical loss element comprises a thin film multilayer filter.

8. Article according to claim 6, wherein the refractive index grating is a long period refractive index grating.

9. Article according to claim 1, wherein the multistage fiber amplifier comprises at least three stages, with at least one lossy component disposed between successive stages, with the lossy components selected to provide, at least at one wavelength within the gain band of the optical amplifier, an attenuation that is greater, in absolute value, than $\overline{G}$ of the multistage fiber amplifier, such that the substantially flat gain band has a spectral width of 80 nm or more.

10. Article according to claim 1, wherein the article is an optical fiber communication system comprising a transmitter, a receiver, and an optical fiber transmission path that signal-transmissively connects the transmitter and the receiver, wherein the optical fiber transmission path comprises said multistage optical amplifier.

11. Article according to claim 10, wherein the optical fiber communication system is a wavelength division multiplexed optical fiber communication system having a multiplicity of signal channels including a lowest wavelength channel and a highest wavelength channel, with the wavelength difference between said lowest and highest wavelength channels being more than 45 nm.

* * * * *